March 17, 1925. Re. 16,023

W. DALTON

RAIL FASTENER

Original Filed Aug. 17, 1923

Inventor
William Dalton,
By J. Howden Bell,
Attorney

Reissued Mar. 17, 1925. Re. 16,023

UNITED STATES PATENT OFFICE.

WILLIAM DALTON, OF SCHENECTADY, NEW YORK.

RAIL FASTENER.

Original No. 1,512,458, dated October 21, 1924. Serial No. 657,944, filed August 17, 1923. Application for reissue filed February 2, 1925. Serial No. 6,482.

*To all whom it may concern:*

Be it known that I, WILLIAM DALTON, a citizen of the United States, and a resident of Schenectady, in the county of Schenectady and State of New York, have invented a certain new and useful Improvement in Rail Fasteners, of which improvement the following is a specification.

My invention relates to means for securing rails to metal ties, which may be of I beam section, T section, trough section, or of any other desired shape.

One object of the invention is to provide a rail fastener of such construction that the rails can be readily removed from the ties, after the fish plates have been taken off, without disturbing the fasteners, which remain secured to the ties.

Another object of the invention is to provide a rail fastener, which requires no openings or cuts to be made in the rails or in the ties, and which will occupy no more pace than the usual spike heads used with wooden ties.

My improved fastener, while permitting the ready removal of the rail, securely holds the latter, when in place, against both lateral and vertical movement relatively to the tie, which is, of course, an essential feature of a successful practical rail fastener.

In the accompanying drawing.

Figure 2:
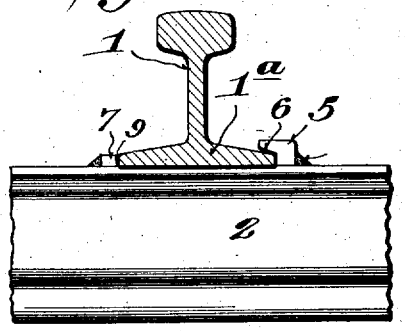
Fig. 2 is a partial side elevation of a tie equipped with the fastener of Fig. 1, the rail being shown in section.
Figure 3:
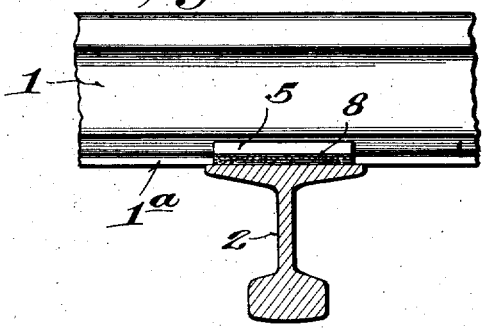
Fig. 3 is a side elevation of the rail and fastener, the tie being shown in section.
Figure 4:
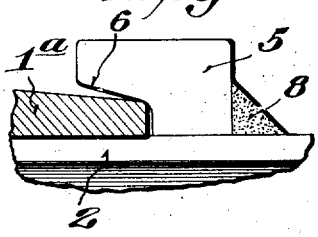
Fig. 4 is a view, on an enlarged scale, of a portion of Fig. 2.
Figure 1:
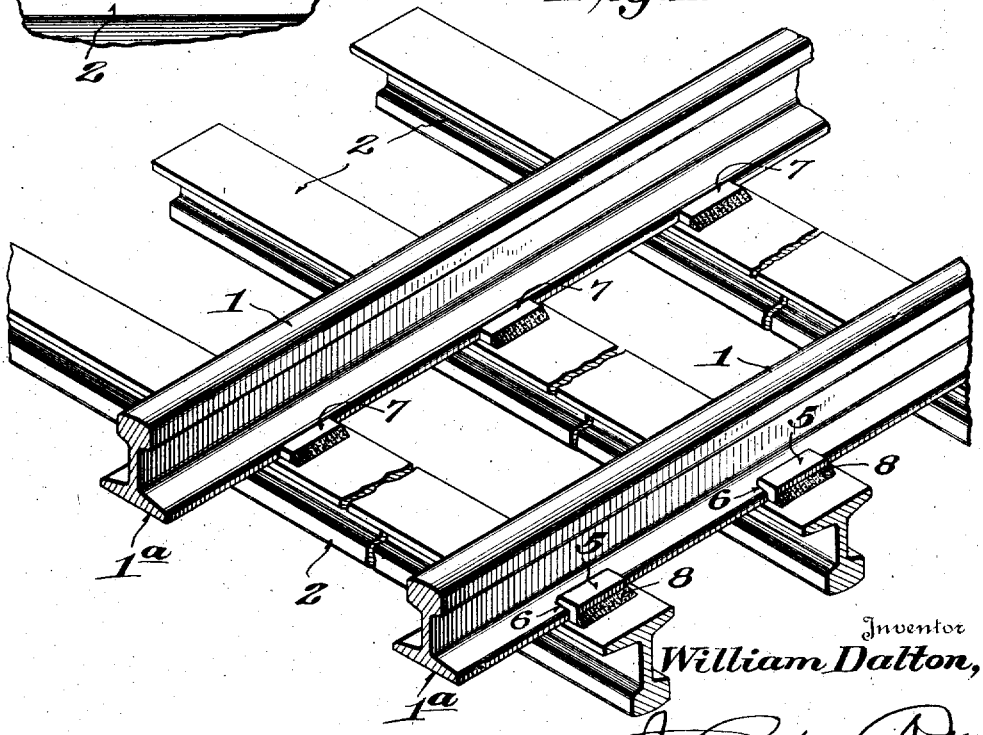
Fig. 1 is a perspective view of a plurality of ties, with the track rails secured thereto by my improved fastener.

These views illustrate a simple embodiment of the invention, in which the rail fasteners are welded to the ties. The welding, however, is not an essential feature of my invention, which is capable of embodiment in other forms.

The retainer member on one side of the rail, as shown on the outside, is in the form of a bar 5, of a length not exceeding the width of the tie 2, and is formed with a recess 6 in its inner side, so as to overlap the adjacent edge of the rail flange 1[a]. The angle of the top wall of said recess is, however, steeper, or more inclined to the horizontal, than the angle of the top of said flange, whereby the rail may be tilted to remove it, as will be further explained hereinafter. The bar 5 is shown as secured to the tie by welding, as indicated at 8. This welded joint may extend merely along the back of the bar, or may be continued along its ends, in which case the length of the bar is, of course, less than the width of the tie.

The retainer member on the other side of the rail is in the form of a rectangular bar 7, also welded to the tie, as shown, and presenting a plane vertical face to the adjacent edge of the rail flange. It will be seen that the retainer members just described do not necessitate any drilling or other working of the rails or ties, and will securely hold the rails in place while permitting longitudinal creeping thereof, and will also enable the rails to be readily removed, by tipping them outwardly, without any withdrawal of nuts, spikes, or other connections. Furthermore, my retainer bars occupy no more space than do the heads of the usual spikes.

Under conditions which render it not convenient to weld the retainer members to the ties, or when it is not desired to do so, other means for securing them to the ties may be used, or the retainer abutments may be integral with the ties or formed on a plate secured to the ties.

I claim as my invention and desire to secure by Letters Patent:

1. Means for securing rails to ties, comprising abutments adapted to be rigidly fastened to the ties so as to project upwardly therefrom on each side of the rail flange, the abutments on one side having substantially plane vertical faces to engage the adjacent edge of the rail flange, and the abutments on the other side being inwardly inclined to overlap the adjacent rail flange without contacting therewith except at its edge, whereby the rail is held against both lateral and vertical movement but can be removed from the ties by tipping it.

2. Means for securing rails to ties, comprising abutments rigid with and projecting upwardly from the ties on each side of the rail flange, the abutments on one side standing vertically and those on the other side being inclined so as to overlap the flange, the inclination of the abutments being at a greater angle to the horizontal than that of the top of the flange, whereby the rail is held against both lateral and vertical movement but can be removed from the ties by tipping it.

3. Means for removably connecting rails to ties, comprising a retainer member adapted to lie across the tie and be permanently secured thereto, the inner face of said retainer member having an undercut recess to overlap the edge of the adjacent rail flange, the top of said recess being at a greater angle to the horizontal than the top of the rail flange, whereby the rail can be removed by tipping it without disturbing the fastener, and a bar, adapted to be permanently secured to the tie on the other side of the rail, and presenting a plane vertical face to the other edge of the rail flange.

4. Means for removably fastening rails to ties, comprising a bar permanently secured to the tie on one side of the rail and having a flange overlapping the rail flange but at a greater angle to the horizontal than said rail flange, so that the rail can be removed by tipping it without disturbing said bar, and a bar permanently secured to the tie on the other side of the rail and presenting a plane vertical face to the rail flange, said bars occupying no more space laterally of the rail flange than the heads of the usual spikes.

5. Means for fastening rails to metal ties, comprising a retainer bar adapted to lie across the tie and having its inner side recessed to overlap the rail flange, the angle of the upper wall of said recess to the horizontal being greater than the angle of the upper side of the rail flange to the horizontal, whereby the rail can be removed by tipping it without disturbing the bar, and a second retainer bar adapted to lie across the tie on the other side of the rail and presenting a plane vertical face to the rail flange, and means whereby said bars can be rigidly secured to the tie without any cutting of the latter.

6. Means for fastening rails to metal ties, comprising a retainer bar adapted to lie across the tie and having its inner side recessed to overlap the rail flange, the angle of the upper wall of said recess to the horizontal being greater than the angle of the upper side of the rail flange to the horizontal, whereby the rail can be removed by tipping it without disturbing the bar, and a second retainer bar adapted to lie across the tie on the other side of the rail and presenting a plane vertical face to the rail flange, said bars being welded to the tie.

7. In a rail fastener, a retainer bar having its inner side recessed to overlap the rail flange, the angle of said recess being such as to permit the rail to be tipped for removal, and a plane faced bar on the other side of the rail, said bars being of a length equal to the width of the tie and adapted to be welded to the tie and the width of said bars being such that they extend laterally from the rail substantially no further than the heads of ordinary railroad spikes.

WILLIAM DALTON.